United States Patent
Tsai et al.

(10) Patent No.: US 7,394,215 B2
(45) Date of Patent: Jul. 1, 2008

(54) THERMAL CONTROL VARIABLE-SPEED CIRCUIT WITHOUT SWITCHING NOISE

(75) Inventors: Ming-Shi Tsai, Taoyuan (TW); Yueh-Lung Huang, Miaoli (TW); Ming-Lung Liu, Taipei (TW)

(73) Assignee: Delta Electronics, Inc., Taoyuan County (TW)

( * ) Notice: Subject to any disclaimer, the term of this patent is extended or adjusted under 35 U.S.C. 154(b) by 204 days.

(21) Appl. No.: 10/685,269

(22) Filed: Oct. 14, 2003

(65) Prior Publication Data
US 2004/0263105 A1 Dec. 30, 2004

(30) Foreign Application Priority Data
Jun. 25, 2003 (TW) .............................. 92211609 U

(51) Int. Cl.
*G05B 5/00* (2006.01)
(52) U.S. Cl. .................. 318/461; 318/471; 318/456; 388/934
(58) Field of Classification Search ............ 388/907.2, 388/934, 910; 318/456, 461, 471, 268, 472, 318/473
See application file for complete search history.

(56) References Cited

U.S. PATENT DOCUMENTS

| 4,320,316 | A | * | 3/1982 | Horii et al. .................. 327/77 |
| 4,717,811 | A | * | 1/1988 | Fujii ........................... 219/497 |
| 4,734,012 | A | * | 3/1988 | Dob et al. ...................... 417/32 |
| 5,043,642 | A | * | 8/1991 | Ohi .............................. 318/254 |
| 5,457,766 | A | * | 10/1995 | Ko .............................. 388/831 |
| 6,011,371 | A | * | 1/2000 | Van Brocklin et al. ....... 318/471 |
| 6,040,668 | A | * | 3/2000 | Huynh et al. ................ 318/471 |
| 6,135,718 | A | * | 10/2000 | Yang ........................... 417/22 |
| 6,301,105 | B2 | * | 10/2001 | Glorioso et al. ............ 361/685 |
| 6,396,231 | B1 | * | 5/2002 | Horng et al. ................ 318/471 |
| 6,414,843 | B1 | * | 7/2002 | Takeda ........................ 361/687 |
| 2003/0130809 | A1 | * | 7/2003 | Cohen et al. ................. 702/45 |

FOREIGN PATENT DOCUMENTS

| JP | 3065159 | 10/1999 |
| JP | 2002-291278 | 10/2002 |
| JP | 2002-325478 | 11/2002 |

* cited by examiner

*Primary Examiner*—Rina I Duda
(74) *Attorney, Agent, or Firm*—Pai Patent and Trademark Law Firm; Chao-Chang David Pai

(57) ABSTRACT

A thermal control variable-speed circuit without switching noise is connected with a driving circuit, which controls the rotation speed of a fan motor using a driving voltage. The thermal control variable-speed circuit includes a reference voltage output circuit and a driving voltage control circuit. The reference voltage output circuit outputs a corresponding reference voltage signal according to ambient temperature changes. The reference voltage output circuit has one end connected to a first resistor in series and to a second resistor in parallel. The driving voltage control circuit outputs a corresponding driving voltage according to the magnitude of the reference voltage signal.

10 Claims, 3 Drawing Sheets

THERMAL CONTROL VARIABLE-SPEED CIRCUIT WITHOUT SWITCHING NOISE

BACKGROUND OF THE INVENTION

1. Field of the Invention

The invention relates to a thermal control variable-speed circuit, and more particularly, to a thermal control variable-speed circuit without switching noise.

2. Description of the Related Art

Recently, methods for controlling the speed of heat dissipating fan motors were mainly accomplished by pulse width modulation (PWM) signals. Such control methods are illustrated in FIGS. 1 and 2. The principle of PWM controlling methods is to utilize a reference voltage signal $V_{ref}$ and a triangular wave (TW) signal to adjust the duty time. Referring to FIG. 2, $V_{ref1}$ and $V_{ref2}$ represent the reference voltage signal $V_{ref}$ under different circumstances. When the reference voltage signal $V_{ref}$ is $V_{ref1}$, the output PWM signal P is $P_1$ with a corresponding duty time $T_1$. On the other hand, when the reference voltage signal $V_{ref}$ is $V_{ref2}$, the output PWM signal P is $P_2$ with a corresponding duty time $T_2$. A driving circuit 12 then controls the operating time of a fan motor 13 according to the duty time of the PWM signal P.

For example, at higher ambient temperatures, $V_{ref2}$ corresponding to the reference voltage signal $V_{ref}$ is produced, and a TW signal is inputted to a PWM signal generating module 11. The PWM signal generating module 11 produces and outputs $P_2$ as the PWM signal P, and the driving circuit 12 controls the duty time of the fan motor 13 according to the duty time $T_2$ of the PWM signal $P_2$. Because the duty time $T_2$ per unit time is longer and thus average duty time of the fan motor 13 is also longer, the rotation speed of the fan motor 13 is faster. Conversely, at lower ambient temperatures, $V_{ref1}$ corresponding to the reference voltage signal $V_{ref}$ is produced. The PWM signal generating module 11 produces and outputs $P_1$ as the PWM signal P. Then, the driving circuit 12 controls the duty time of the fan motor 13 according to the duty time $T_1$ of the PWM signal $P_1$. Because the duty time $T_1$ per unit time is shorter and average duty time of the fan motor 13 is also shorter, the rotation speed of the fan motor 13 is slower, thereby accomplishing the purpose of controlling the rotation speed of the fan motor 13.

However, such methods for controlling the rotation speed of a fan motor by using PWM signals are prone to the following shortcomings. While the driving circuit 12 is dedicated to constantly receive PWM signals P for controlling the fan motor, the operation of switching between high and low levels of the PWM signal P causes switching noises that further produce other mild noises. When the fan motor operates at high rotation speeds, the noise level is below that created by the fan motor. However, when the rotation speed of the fan motor decreases, the noises produced become apparent and cannot meet the requirements of system manufacturers. In addition, in order to ensure that the driving circuit 12 and the fan motor 13 are appropriately controlled by the PWM signals P, it is necessary to constrain the duty time of the PWM signals P within a range of 30% to 85%. However, the rotation speed of the fan motor will then be in a limited range and thus the ambient temperature cannot be adjusted as desired.

Therefore, it is an important task of the invention to avoid the switching noises during the rotation of the fan motor, and to broaden the controllable range of the rotation speed of the fan motor.

BRIEF SUMMARY OF THE INVENTION

To overcome the aforesaid difficulties, an object of the invention is to provide a thermal control variable-speed circuit without switching noise, in that the thermal control variable-speed circuit is capable of avoiding switching noises caused by the rotation of a fan motor.

The other object of the invention is to provide a thermal control variable-speed circuit without switching noise, in that the thermal control variable-speed circuit has a greater controllable range of the rotation speed of a fan motor, compared to PWM controlling methods.

To achieve the aforesaid objects, the thermal control variable-speed circuit according to the invention is connected with a driving circuit which controls the rotation speed of a fan motor. The thermal control variable-speed circuit is also connected to a power supply, and outputs a corresponding driving voltage according to ambient temperature changes. The driving circuit uses the driving voltage outputted by the thermal control variable-speed circuit to drive the fan motor so as to control the rotation speed of the fan motor.

The thermal control variable-speed circuit includes a reference voltage output circuit and a driving voltage control circuit. The reference voltage output circuit is connected to a power supply, and outputs a corresponding reference voltage signal according to ambient temperature changes. The reference voltage output circuit has an output end connected to a first resistor in series, and to a second resistor in parallel, such that the reference voltage signal becomes even more sensitive to ambient temperature changes. The driving voltage control circuit receives the reference voltage signal outputted by the reference voltage output circuit, and outputs a corresponding driving voltage according to the amplitude of the reference voltage signal received. Specifically, when ambient temperature is comparatively low, the reference voltage output circuit outputs a relatively low reference voltage signal. After receiving a relatively low reference voltage signal, the driving voltage control circuit outputs a relatively low driving voltage so as to drive the fan motor at a relatively low rotation speed. On the other hand, when ambient temperature is comparatively high, the reference voltage output circuit outputs a relatively high reference voltage signal. After receiving a relatively high reference voltage signal, the driving voltage control circuit outputs a relatively high driving voltage so as to drive the fan motor at a relatively high rotation speed. Consequently, it is possible to control the rotation speed of the fan motor by ambient temperature changes.

In the thermal control variable-speed circuit without switching noise according to the invention, only the amplitude of a driving voltage is used for controlling the rotation speed of a fan motor. There is no need for generating any control signal, such as PWM signal, switching between high and low levels and thus there is no such switching noise as is caused by using control signals in the PWM controlling method. Moreover, since the rotation speed of the fan motor is controlled only by the amplitude of the driving voltage, the fan motor has a greater controllable range of rotation speed compared to the PWM controlling methods.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

For better understanding of the invention, detailed descriptions of the thermal control variable-speed circuit without switching noise in preferred embodiments according to the invention is given below with the accompanying drawings.

Figure 1:
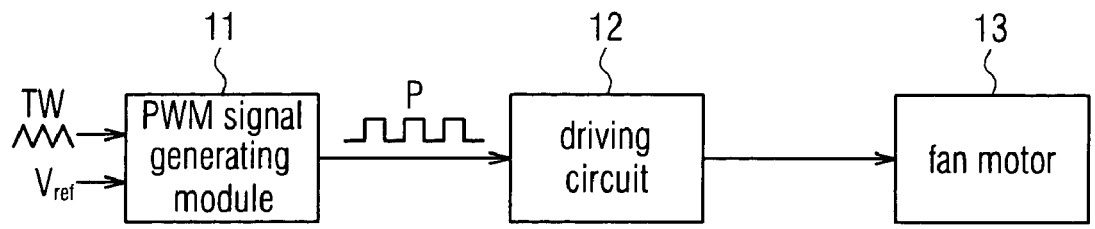
FIG. 1 shows a block diagram illustrating a PWM controlling method for controlling fan motor speed according to the prior art.
Figure 2:
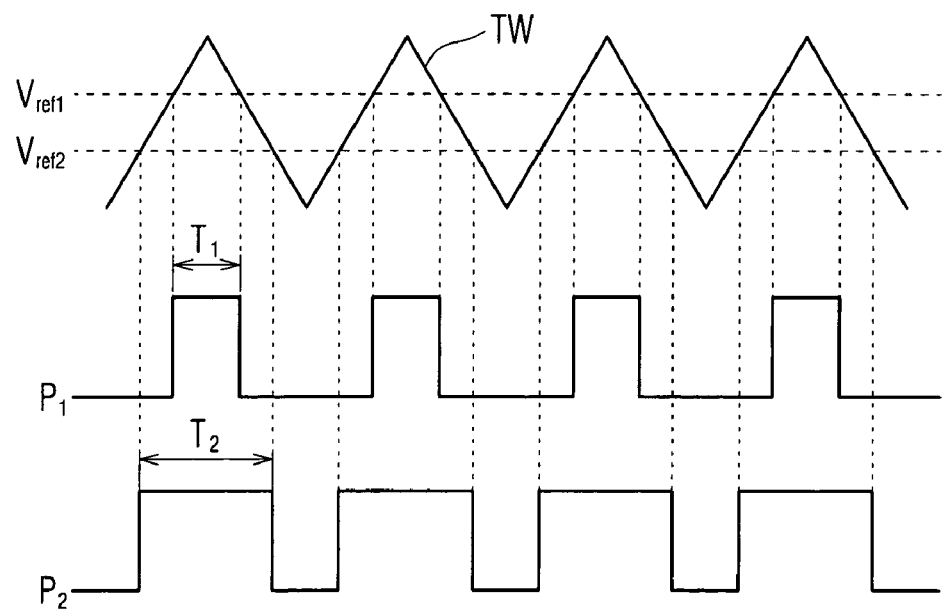
FIG. 2 shows a schematic view illustrating the principle of a control method using PWM according to the prior art.
Figure 3:
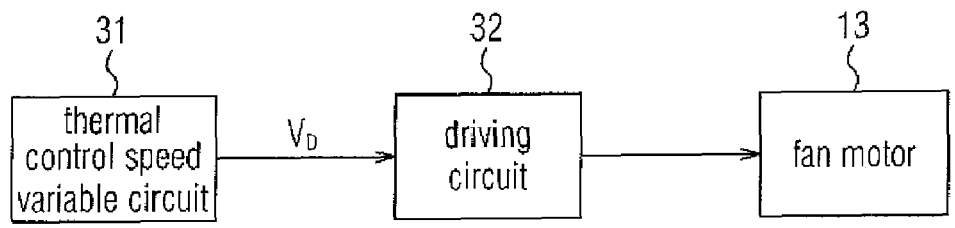
FIG. 3 shows a block diagram of the thermal control variable-speed fan motor in a preferred embodiment according to the invention.

Referring to FIG. 3, a thermal control variable-speed circuit 31 without switching noise according to the invention is connected with a driving circuit 32, wherein the driving circuit 32 is for controlling the rotation speed of a fan motor 13. The thermal control variable-speed circuit 31 is connected to a power supply $V_{CC}$, and outputs a corresponding driving voltage $V_D$ according to ambient temperature changes. Functions of the driving circuit 32 are similar to those of the prior art. However, the difference is that the prior art uses a driving circuit for receiving PWM signals in order to control the rotation speed of a fan motor, whereas the present invention uses the driving circuit 32 for receiving the driving voltage $V_D$ that is further used to control the fan motor 13. Functions of the fan motor 13 are identical to those of the prior art, and shall not be described.

Figure 4:
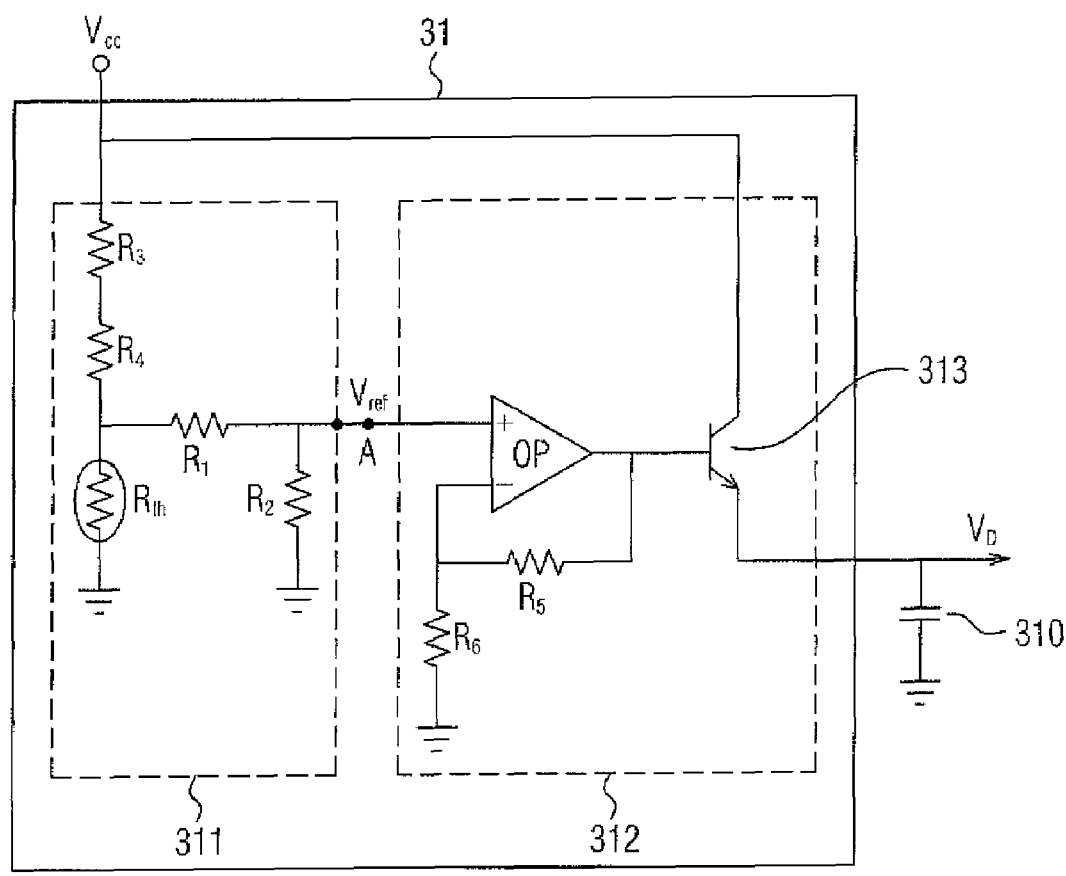
FIG. 4 shows a circuit diagram of the thermal control variable-speed fan motor in a preferred embodiment according to the invention.
Figure 5:
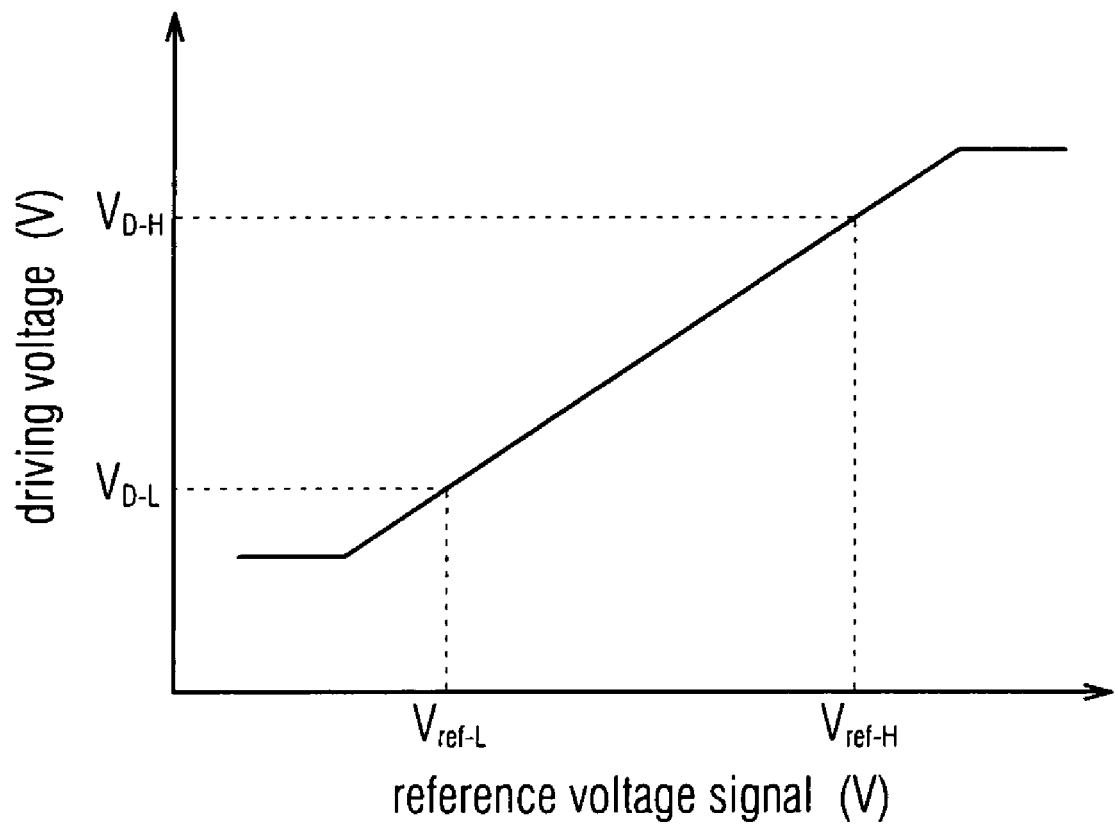
FIG. 5 shows a diagram illustrating a relationship between the reference voltage signal and the driving voltage in a preferred embodiment according to the invention.

Referring to FIG. 4 showing a circuit diagram of the thermal control variable-speed circuit 31, the thermal control variable-speed circuit 31 includes a reference voltage output circuit 311, and a driving voltage control circuit 312. The reference voltage output circuit 311 has a first resistor $R_1$, a second resistor $R_2$, a thermistor $R_{th}$, a third resistor $R_3$, and a fourth resistor $R_4$. According to the present invention, one end of the thermistor $R_{th}$ is coupled to one end of the first resistor $R_1$ and the power supply $V_{cc}$ and the other end of the thermistor $R_{th}$ is grounded, the other end of the first resistor $R_1$ outputs a reference voltage signal $V_{ref}$ and is coupled to one end of the second resistor $R_2$, and the other end of the second resistor $R_2$ is grounded. The third resistor $R_3$ has one end connected to a power supply $V_{CC}$, and the fourth resistor $R_4$ has one end connected to the other end of the third resistor $R_3$. The thermistor $R_{th}$ has a negative temperature coefficient. That is, when ambient temperature drops, the resistance of the thermistor $R_{th}$ increases. The thermistor $R_{th}$ has one end connected to the other end of $R_4$, and the other end grounded. The first resistor $R_1$ has one end connected between the fourth resistor $R_4$ and the thermistor $R_{th}$, and the other end outputting the reference voltage signal $V_{ref}$. The second resistor $R_2$ has one end connected to an output end of the first resistor $R_1$, and the other end grounded. It is to be noted that the second resistor $R_2$ may be a variable resistor for adjusting the resistance of the second resistor $R_2$, thereby controlling the sensitivity of the reference voltage signal $V_{ref}$ with respect to ambient temperature changes. In other words, the reference voltage signal $V_{ref}$ shown in FIG. 5 may be changed based on the adjusting of the second resistor $R_2$.

The driving voltage control circuit 312 has an operational amplifier OP, a fifth resistor $R_5$, a sixth resistor $R_6$, and a transistor 313. The operational amplifier OP has a non-inverted input end connected to an output end of the reference voltage output circuit 311, so as to receive the reference voltage signal $V_{ref}$. The fifth resistor $R_5$ is connected between an inverted input end of the operational amplifier OP and output end of the operational amplifier OP. The sixth resistor $R_6$ is connected between the inverted input end of the operational amplifier OP and ground. The transistor 313 has a base connected to the output end of the operational amplifier OP, a collector connected to the power supply $V_{CC}$, and an emitter connected to the driving voltage $V_D$. In another embodiment, a capacitor 310 can be connected to the emitter of the transistor 313 for filtering noises of the driving voltage $V_D$ transmitted to the fan motor.

The operation of the thermal control variable-speed circuit without switching noises according to the invention for controlling the rotation speed of a fan motor shall be described. Since the thermistor $R_{th}$ in the reference voltage output circuit 311 has a negative temperature coefficient, when ambient temperature drops the resistance of the thermistor $R_{th}$ rises and also the reference voltage signal $V_{ref}$ at point A lowers as shown in FIG. 4. When the reference voltage signal $V_{ref}$ received by the driving voltage control circuit 312 lowers, the output driving voltage $V_D$ outputted by the driving voltage control circuit 312 also decreases. Therefore, as the output driving voltage $V_D$ outputted by the driving voltage control circuit 312 decreases, the rotation speed of the fan motor 13 decreases accordingly, so as to accomplish the purpose of controlling the rotation speed of the fan motor 13. Specifically, referring to FIG. 5, when ambient temperature is comparatively lower, the resistance of the thermistor $R_{th}$ rises and then the reference voltage output circuit 311 outputs a correspondingly lower reference voltage signal $V_{ref-L}$. Upon receiving the reference voltage signal $V_{ref-L}$, the driving voltage control circuit 312 outputs a correspondingly lower driving voltage $V_{D-L}$ to drive the fan motor 13 at a correspondingly lower rotation speed. On the other hand, when ambient temperature is comparatively higher, the resistance of the thermistor $R_{th}$ increases drops, the reference voltage output circuit 311 outputs a correspondingly higher reference voltage signal $V_{ref-H}$. Upon receiving the reference voltage signal $V_{ref-H}$, the driving voltage control circuit 312 outputs a correspondingly higher driving voltage $V_{D-H}$ to drive the fan motor 13 at a correspondingly higher rotation speed.

According to the thermal control variable-speed circuit without switching noise of the invention, control signals such as PWM signals switching between high and lower levels are not required. Hence, the rotation speed of a fan motor is controlled according to ambient temperature changes, so as to avoid switching noise caused by using control signals used to control the rotation speed of the fan motor. Moreover, since the rotation speed of the fan motor is controlled only by the amplitude of the driving voltage, the fan motor has a greater controllable range of rotation speed compared to the PWM controlling methods.

The embodiments and examples according to the invention are fully illustrated in the above descriptions. For those who are skilled in this art, it is understood that the embodiments according to the invention are illustrative but not limitative. For instance, in order to filter noises, at least one capacitor may be connected at the power supply end of the fan motor. Without departing from the true spirit and scope of the invention, various modifications and changes of the direct current fan motor shall be covered by the appended claims of the invention.

What is claimed is:

1. A thermal control variable-speed circuit without switching noise, connected with a driving circuit, for controlling the rotation speed of a fan motor, comprising:
   a reference voltage output circuit, which is connected to a power supply and outputs a corresponding reference voltage signal, wherein said reference voltage signal is changeable according to ambient temperature and said reference voltage output circuit comprises a first resistor, a thermistor and a second resistor, wherein one end of said thermistor is coupled to one end of the first resistor and the power supply and the other end of said thermistor is grounded, the other end of the first resistor outputs the reference voltage signal and is coupled to one end of the second resistor, and the other end of the second resistor is grounded; and
   a driving voltage control circuit, which receives said reference voltage signal and outputs a corresponding driving voltage according to the amplitude of said reference voltage signal, wherein said driving voltage is proportional to said reference voltage signal and used to control the rotation speed of said fan motor.

2. The thermal control variable-speed circuit without switching noise as claimed in claim 1, wherein said one end of said thermistor is coupled with said power supply through
   a third resistor having one end connected to said power supply; and
   a fourth resistor having one end connected to the other end of said third resistor and the other end connected to said one end of said thermistor, wherein said thermistor has a negative temperature coefficient.

3. The thermal control variable-speed circuit without switching noise as claimed in claim 1, wherein said second resistor is a variable resistor.

4. The thermal control variable-speed circuit without switching noise as claimed in claim 2, wherein said driving voltage control circuit further comprises:
   an operational amplifier having a non-inverted input end connected to a connection point between the first resistor and the second resistor for receiving said reference voltage signal;
   a fifth resistor connected between an inverted input end of said operational amplifier and an output end of said operational amplifier;
   a sixth resistor connected between the inverted input end of said operational amplifier and ground; and
   a transistor having a base connected to said output end of said operational amplifier, a collector connected to said power supply, and an emitter for outputting said driving voltage.

5. The thermal control variable-speed circuit without switching noise as claimed in claim 1, further comprising a capacitor connected to said driving circuit for filtering noises.

6. A thermal control variable-speed circuit without switching noise, connected with a driving circuit, for controlling the rotation speed of a fan motor, comprising:
   a reference voltage output circuit, which is connected to a power supply and outputs a corresponding reference voltage signal, wherein said reference voltage signal is changeable according to ambient temperature and said reference voltage output circuit comprises a first resistor, a thermistor and a second resistor, wherein one end of the first resistor is coupled to the power supply and one end of the thermistor and the other end of the first resistor is coupled to one end of the second resistor, the other end of the thermistor is grounded, the other end of the second resistor is grounded and the reference voltage signal is outputted from a connection point between the first resistor and the second resistor; and
   a driving voltage control circuit, which receives said reference voltage signal and outputs a corresponding driving voltage according to the amplitude of said reference voltage signal, wherein said driving voltage is proportional to said reference voltage signal and used to control the rotation speed of said fan motor.

7. The thermal control variable-speed circuit without switching noise as claimed in claim 6, wherein said one end of the first resistor is coupled with said power supply through
   a third resistor having one end connected to said power supply; and
   a fourth resistor having one end connected to the other end of said third resistor and the other end connected to said one end of the first resistor.

8. The thermal control variable-speed circuit without switching noise as claimed in claim 6, wherein said second resistor is a variable resistor.

9. The thermal control variable-speed circuit without switching noise as claimed in claim 7, wherein said driving voltage control circuit further comprises:
   an operational amplifier having a non-inverted input end connected to the connection point between the first resistor and the second resistor for receiving said reference voltage signal;
   a fifth resistor connected between an inverted input end of said operational amplifier and an output end of said operational amplifier;
   a sixth resistor connected between the inverted input end of said operational amplifier and ground; and
   a transistor having a base connected to an output end of said operational amplifier, a collector connected to said power supply, and an emitter for outputting said driving voltage.

10. The thermal control variable-speed circuit without switching noise as claimed in claim 6, further comprising a capacitor connected to said driving circuit for filtering noises.

* * * * *